United States Patent

Golownia et al.

(10) Patent No.: US 7,622,881 B2
(45) Date of Patent: Nov. 24, 2009

(54) METHOD AND APPARATUS FOR ESTIMATING SYSTEM INERTIA WHERE NUMBER OF MOTOR ROTATIONS ARE RESTRICTED

(75) Inventors: John J. Golownia, Hartford, WI (US); Robert J. De Lange, Greenfield, WI (US); Thomas J. Rehm, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 267 days.

(21) Appl. No.: 11/712,145

(22) Filed: Feb. 28, 2007

(65) Prior Publication Data

US 2008/0203960 A1  Aug. 28, 2008

(51) Int. Cl.
*G05D 15/00* (2006.01)
(52) U.S. Cl. ............... 318/646; 318/460; 318/638
(58) Field of Classification Search ............ 318/646, 318/460, 638; 73/862.23
See application file for complete search history.

(56) References Cited

U.S. PATENT DOCUMENTS

| | | | | |
|---|---|---|---|---|
| 5,175,483 A | * | 12/1992 | Fujii et al. ............... | 318/807 |
| 6,037,736 A | * | 3/2000 | Tsuruta et al. ............ | 318/609 |
| 6,229,722 B1 | * | 5/2001 | Ichikawa et al. .......... | 363/71 |
| 6,490,514 B2 | * | 12/2002 | Kurishige et al. ........ | 701/41 |
| 6,611,125 B2 | * | 8/2003 | Nagata et al. ............ | 318/727 |
| 6,920,800 B2 | * | 7/2005 | Rehm et al. .............. | 73/862.23 |
| 7,057,366 B1 | * | 6/2006 | Tsai et al. ................ | 318/561 |
| 7,102,315 B2 | * | 9/2006 | Nakata et al. ........... | 318/568.22 |

* cited by examiner

*Primary Examiner*—Bentsu Ro
*Assistant Examiner*—David S Luo
(74) *Attorney, Agent, or Firm*—Quarles & Brady LLP; Alexander R. Kuszewski

(57) ABSTRACT

A method and apparatus for estimating inertia wherein a load has a limited range of load travel, the method comprising the steps of identifying an intermediate position along the range of load travel that is separated from a first end of the range of load travel, with the load separated from a first end of the range of load travel, increasing a velocity of the electric motor from a first velocity, identifying when the load has reached the intermediate position, identifying the motor velocity at the intermediate position as a second velocity, detecting a first rate of velocity change from the first velocity to the second velocity and deriving an inertia value as a function of the first rate of velocity change.

19 Claims, 3 Drawing Sheets

METHOD AND APPARATUS FOR ESTIMATING SYSTEM INERTIA WHERE NUMBER OF MOTOR ROTATIONS ARE RESTRICTED

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to apparatus and methods for controlling operation of electric motors, and more particularly to determining motor inertia in cases where a load is restricted to a limited range of travel.

Some industrial electric motors are operated by a motor drive which responds to a velocity command by applying electricity to the motor in a manner that causes the motor to operate at the commanded velocity. In a typical motor drive, the velocity command is compared to a measurement of the actual velocity of the motor to produce a commanded torque indicating how the motor's operation needs to change in order to achieve the commanded velocity. For example, to accelerate the motor a positive commanded torque is produced, whereas a negative commanded torque is required to decelerate the motor.

The amount of torque that is required to produce a given change in velocity is a function of the inertia of the motor and the mechanical apparatus being driven. The inertia in a typical industrial installation is determined and programmed into the motor drive upon commissioning the motor. Thus it is desirable to provide a mechanism for accurately estimating motor system inertia.

The traditional process for estimating the motor system inertia involves operating the motor through a linear acceleration/deceleration profile during a commissioning process. Here, for instance, a high target or test velocity may be specified, the motor and load may be accelerated to the test velocity and then decelerated to a zero or nominal velocity value. If the velocity changes at a constant rate, the motor torque is constant during both acceleration and deceleration and it is relatively straight forward to calculate the inertia. This is the case with drive systems that have regenerative capabilities (i.e. where the electric current induced in the stator coils during deceleration is able to flow unrestricted back into the DC supply bus for the motor drive).

In systems where there is no limit on motor rotations and load movement, the acceleration/deceleration inertia estimating techniques work well as the motor can be accelerated up to the high test velocity without regard to motor rotation limitations or load movement limitations.

Unfortunately, in some cases a motor and/or load may be restricted so that a motor cannot be driven to a high test velocity. For instance, in some systems a rotating motor may drive a linearly moving machine component (e.g., a transfer line) where the machine component moves between first and second limit positions at different ends of a range of load movement. Here, for example, a motor may only rotate 200 times while moving the linear machine component between the first and second limit positions. In the present example the motor may not be able to reach a high test velocity and then decelerate to a zero velocity within 200 rotations.

Where a motor cannot reach a test velocity specified by a commissioning procedure, the typical acceleration/deceleration inertia estimating technique typically is not performed thereby avoiding load and motor damage. Instead, in at least some cases, a person commissioning the system would have to manually measure motor operating characteristics during normal motor operation, calculate an inertia estimate based on the manual measurements and then enter the inertia estimate into the system for use by the system controller.

BRIEF SUMMARY OF THE INVENTION

It has been recognized that in applications where motor rotations and/or load movement is restricted such that a motor cannot reach a high test commissioning velocity specified for an inertia determining procedure and then be decelerated to a zero velocity within the restrictions, a good inertia estimate can nonetheless be generated by accelerating the motor to an intermediate position along the range of load travel and decelerating the motor to a zero velocity prior to the end of the range of load travel. Here, a first velocity is identified prior to acceleration and the velocity at the intermediate position is identified as a second velocity. After the load is in the intermediate position, the motor is decelerated. During acceleration and deceleration, motor torque is sampled and separate acceleration and deceleration average torque values are generated. The change in velocity during acceleration is divided by the acceleration time to derive a rate of acceleration up to the intermediate position. A similar derivation of the rate of deceleration involves dividing the change of velocity during deceleration by the deceleration time. The inertia of the motor system is the sum of the acceleration and deceleration average torque magnitudes divided by the sum of the magnitudes of the acceleration rate and the deceleration rate.

In at least some embodiments load position can be translated into motor rotations and the motor rotations can be counted to determine when the intermediate position has been reached. In at least some applications the intermediate position will be between $\frac{1}{3}^{rd}$ and $\frac{2}{3}^{rds}$ of the range of load travel and in some cases the intermediate position may be substantially ½ the range of load travel.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
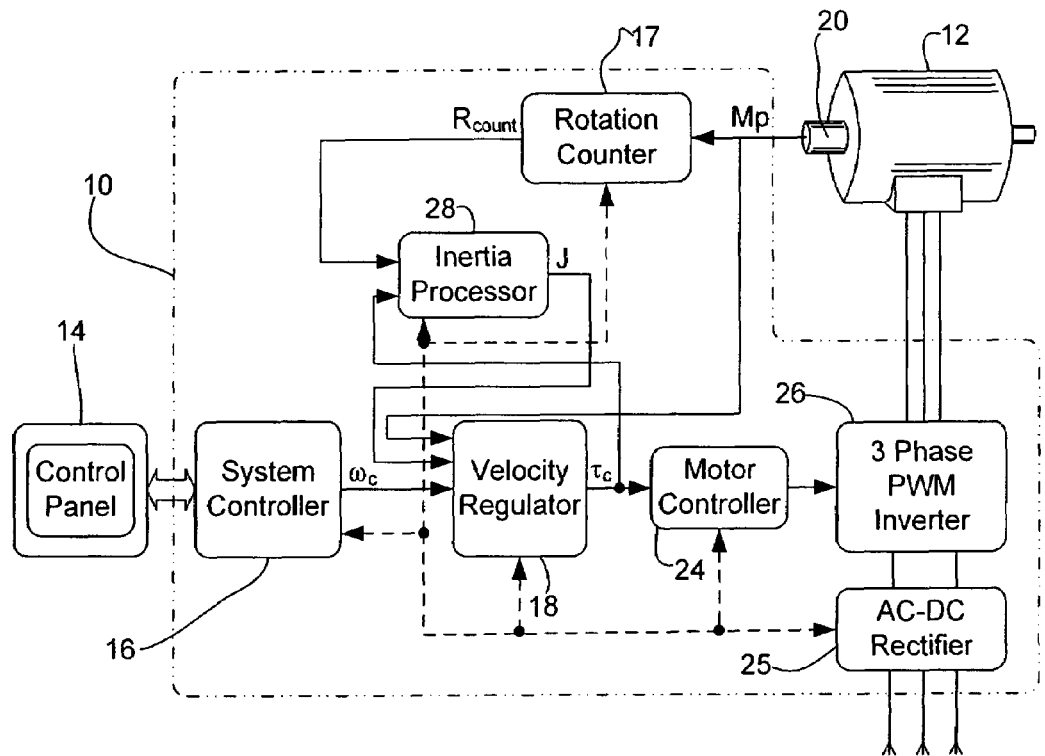
FIG. 1 is a schematic diagram illustrating a control system according to at least one embodiment of the present invention.

Referring now to the drawings wherein like reference numerals correspond to similar elements throughout the several views and, more specifically, referring to FIG. 1, a motor drive 10 controls a three-phase electric motor 12, which drives mechanical elements (not labeled) on a machine (e.g. a load). A control panel 14 is linked to drive 10 and operates as a user interface. To this end, panel 14 may include a keypad or other input device and a display through which an operator can enter commands and commissioning values and can receive information about the motor's and the drive's performance.

Exemplary drive 10 includes, among other components, a system controller 16, a velocity regulator 18, a motor controller 24, a PWM inverter 26, a rectifier 25, a rotation counter 17 and an inertia processor 28. Control panel 14 is connected to controller 16 which governs the operation of the other drive components. Controller 16 may have additional inputs and outputs through which commands and motor performance data are exchanged with external control devices. Controller 16 supplies control signals via line 15 to other components of the motor drive 10, as will be described. The functions of controller 16 and the other components of the motor drive are performed by one or more microprocessors which execute software programs that implement those functions.

In response to these commands, the system controller 16 produces a velocity command $\omega_c$ that indicates a desired or command velocity for the motor 12. The velocity command $\omega_c$ is applied to a velocity regulator 18 which also receives a position signal Mp from an encoder 20 attached to the motor 12. The encoder 20 provides either a digital word indicating absolute angular position of the shaft of the motor or a series of pulses indicating incremental motion and direction. By monitoring the change of that position signal Mp with time, the velocity regulator 18 is able to determine the actual motor velocity.

Velocity regulator 18 produces a commanded torque $\tau_c$ in response to the relationship between the commanded velocity and the actual velocity. The commanded torque is generated in a conventional manner and indicates how the motor 12 should be operated in order to achieve the commanded velocity. For example, if the motor is operating slower than the commanded velocity, a positive torque has to be generated in the motor in order to increase its velocity. Similarly, a negative commanded torque is generated when the motor is operating faster then desired.

Commanded torque $\tau_c$ produced is applied to an input of a conventional motor control 24 which responds by producing a set of control signals for a standard PWM inverter 26. The control signals operate the PWM inverter 26 which switches DC voltage from an AC-DC rectifier 25 to generate PWM waveforms that are applied to the stator coils of three-phase electric motor 12. The PWM waveforms are varied to control the motor velocity as is well understood by those skilled in motor control.

In addition to receiving the velocity command $\omega_c$ and the encoder signal, the velocity regulator 18 also receives a value indicating the inertia $\hat{J}$ of the motor 12 and the mechanical system driven by the motor, hereinafter collectively referred to as the "motor system". The inertia is used to set circuit gains in the velocity regulator 18. The value of the inertia is supplied by an inertia processor 28, the details of which are shown in FIG. 2.

Referring still to FIG. 1, rotation counter 17 receives the position signal Mp from encoder 20 and, as the label implies, determines a number of rotations $R_{count}$ of the motor 12 from some initial condition. For instance, where motor 12 is linked to a transfer line that moves between first and second limit positions at first and second ends of a range of load travel where the motor rotates 200 times as the transfer line travels between the first and second positions, the first limit position may correspond to a first rotation while the second limit position corresponds to a $200^{th}$ rotation and intermediate positions between the first and second limit positions would correspond to other motor rotations between the first and the $200^{th}$. The rotation count $R_{count}$ is provided to inertia processor 28.

Figure 2:
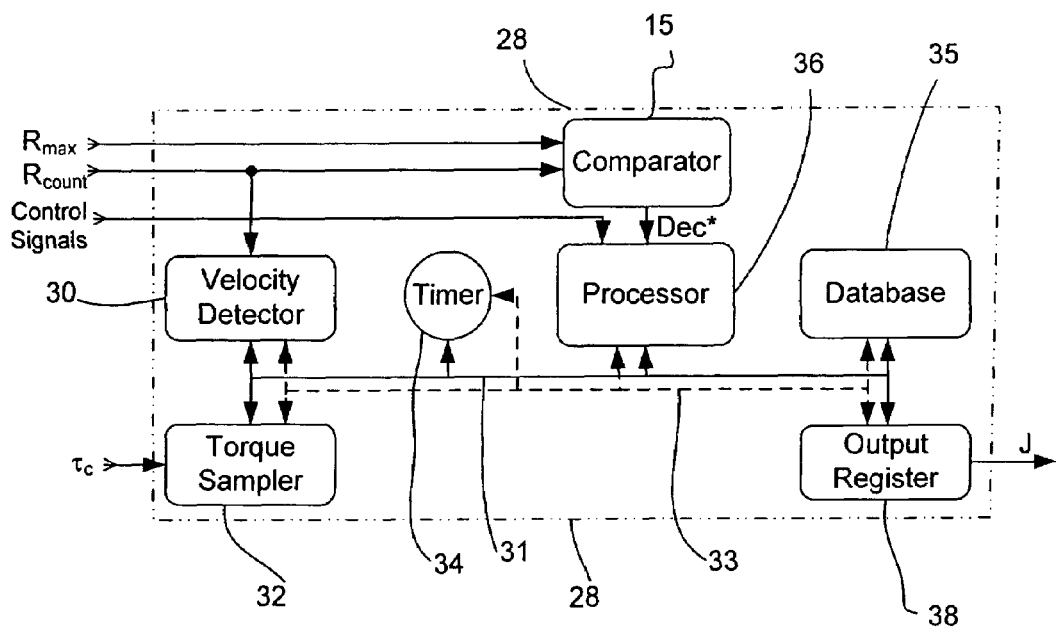
FIG. 2 is a schematic diagram illustrating one exemplary inertia processor that may be included as part of the system shown in FIG. 1.

Referring now to FIG. 2, exemplary inertia processor 28 includes a comparator 15, a velocity detector 30, a torque sampler 32, a timer 34, a processor 36, a database 35 and an output register 38. Velocity detector 30 receives the $R_{count}$ value and processes that value along with a time signal from timer 34 to determine the actual instantaneous velocity of motor 12. Torque sampler 32 periodically acquires samples of the commanded torque $\tau_c$ produced by the velocity regulator 18 (see FIG. 1). Timer 34 measures time intervals between certain events described hereafter. Data produced by velocity detector 30, torque sampler 32, and timer 34 is sent via a data bus 31 to database 35 for storage. Processor 36 controls operation of the other inertia processor components via control lines 33 and derives the estimate of the motor system inertia $\hat{J}$ from the stored data. The resultant inertia value $\hat{J}$ is held in output register 38 from which it is communicated to velocity regulator 18.

The inertia of the motor system is relatively constant and needs to be determined only upon initial commissioning of the motor 12 or whenever changes are made to the motor system which affect its inertia. On those occasions, the operator enters the appropriate command into the control panel 14 which causes the motor drive to commence an inertia determination procedure. That operator command causes the system controller 16 to issue a control signal which instructs the inertia module 28 to enter the determination mode. The inertia can be determined even when a constant load is applied to the motor.

Figure 3:
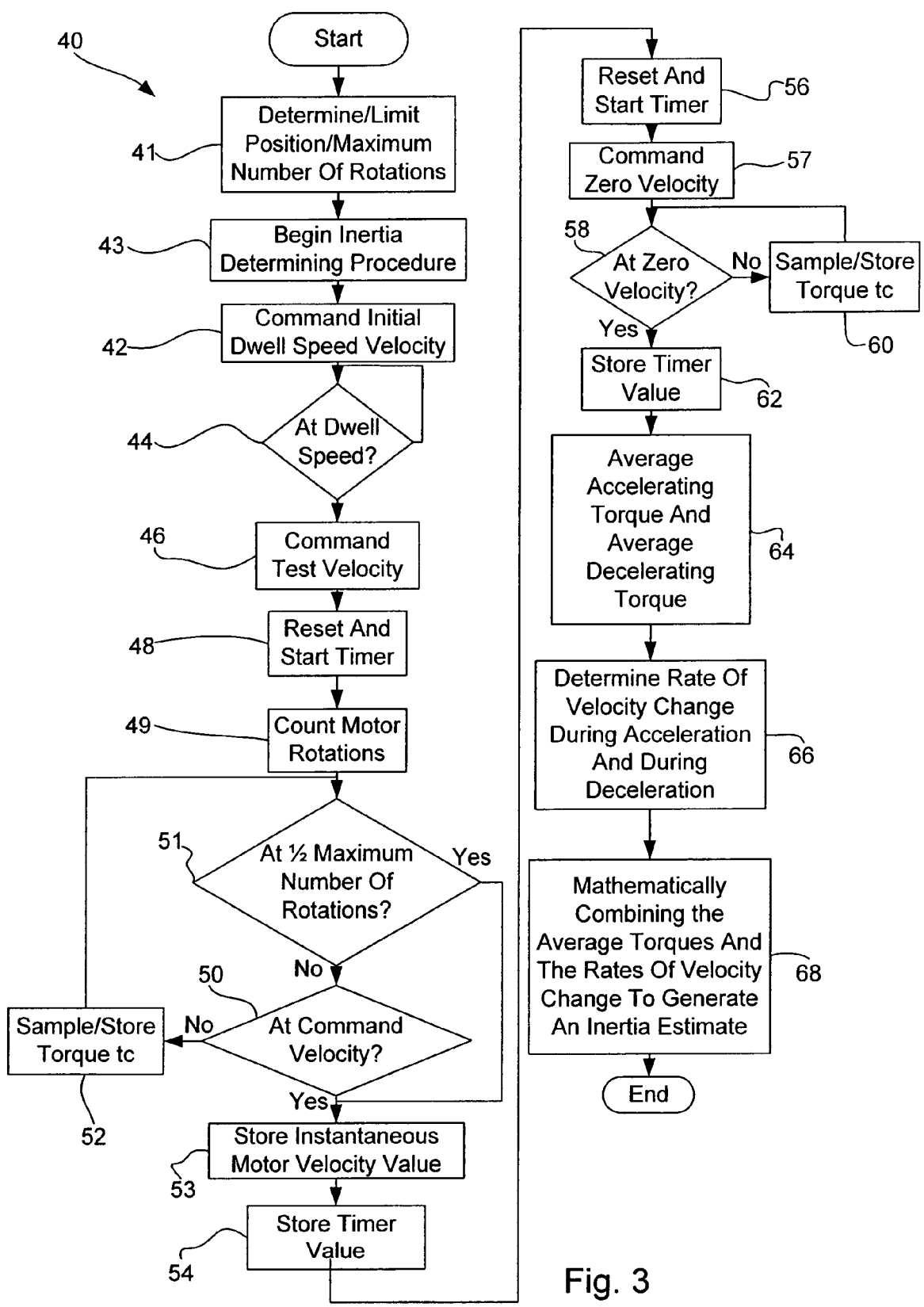
FIG. 3 is a flow chart illustrating an inertia determining method that may be performed by the system of FIG. 1.
Figure 4A:
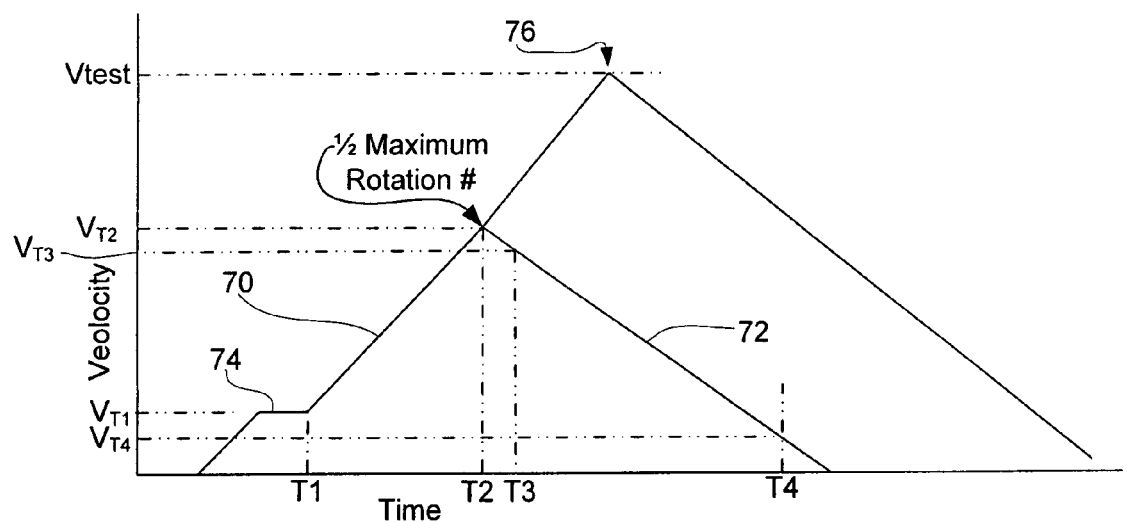
FIG. 4A is a graph illustrating motor velocity versus time during the process shown in FIG. 3.

The inertia determination procedure 40 is depicted by the flowchart in FIG. 3 and operates the motor through a velocity profile shown in FIG. 4A which has an acceleration phase 70 and a deceleration phase 72. This procedure begins at block 41 where a person responsible for commissioning the drive 10 determines the limit positions of a load being driven by the motor 12. Here, the limit positions may be expressed in terms of motor rotations. For instance, in the above example where a motor rotates 200 times while driving a transfer line between first and second limit positions, the limit positions may be at the first and the $200^{th}$ motor rotations. In this case a maximum position for the motor may be the $200^{th}$ rotation and therefore the limit position would be identified by the person commissioning as the $200^{th}$ rotation. Here, the 200 rotation value is entered as the maximum number of rotations $R_{max}$ which is provided to comparator 15 (see FIG. 2).

At block 43 the inertia determining procedure commences. At block 42, controller 16 in FIG. 1 produces a velocity command $\omega_c$ to operate motor 12 at a relatively slow initial dwell speed velocity $V_{T1}$. The velocity regulator 18 responds to this velocity command by issuing a corresponding torque command $\tau_c$ to the motor control 24. This causes the motor control 24 to operate the PWM inverter 26 in a manner that applies electricity to accelerate the motor 12 to the initial dwell speed velocity $V_{T1}$ at profile plateau 74. Operating the motor at a relatively slow initial velocity prior to acquiring data for the inertia computation ensures that any lost motion in a transmission or mechanical linkage of the motor system occurs before data acquisition for inertia determination. At block 44, processor 36 detects when this initial velocity $V_{T1}$ has been achieved.

Once initial velocity $V_{T1}$ is achieved for a short time, a control signal is sent to system controller 16 which responds at block 46 by issuing a new commanded velocity designating a high test velocity $V_{test}$ toward which the motor 12 is to accelerate. At block 48, timer 34 is reset and starts to measure the amount of time to accelerate to the test velocity. Thereafter, at block 49, counter 17 (see FIG. 1) counts the number of motor rotations that occur and provides the count value $R_{count}$ to inertia processor 28.

At decision block 51 comparator 15 compares the actual motor rotation count $R_{count}$ to a count that represents an intermediate position of the load which, in the example above, is an intermediate position of the transfer line. The intermediate position can be any position from which it is know that the load will be able to reach a zero velocity prior to the end of its range of travel given the velocity that the load/motor should reach at the intermediate position. For instance, in some cases the intermediate position may correspond to a rotation count between $\frac{1}{3}^{rd}$ and $\frac{2}{3}^{rds}$ of the maximum rotation count (e.g., 66 and 132 rotations in the present example where the maximum rotation count is 200). In most cases it has been determined that a safe intermediate position is substantially ½ the maximum count. In FIG. 3 the actual rotation count $R_{count}$ is compared to ½ the maximum count $R_{max}$. Once the actual rotation count is equal to ½ the maximum count (i.e., indicates the intermediate position has been achieved) control passes up to block 53.

Figure 4B:
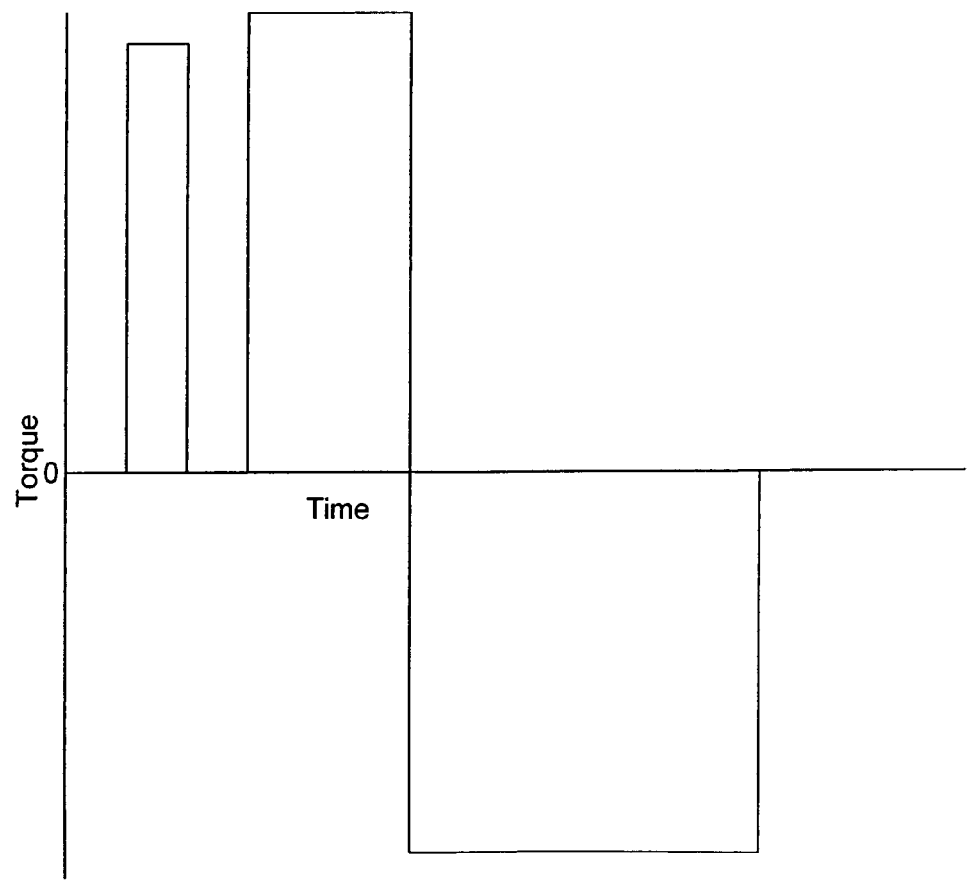
FIG. 4B is a graph corresponding to the graph of FIG. 4A showing motor torque versus time.

Referring still to FIGS. 1-3, where the actual count is less than the count corresponding to the intermediate position, control passes to block 50. At block 50, processor 36 determines whether the motor 12 has reached the test velocity $V_{test}$. If the motor velocity is below the test velocity, the inertia determination procedure 40 branches to block 52 at which the torque sampler 32 stores the value of the commanded torque $\tau_c$ in database 35. FIG. 4B illustrates the variation in torque during the exemplary velocity profile in FIG. 4A. Because of the nature of the feedback control loop that governs motor operation, it can be accurately assumed that the actual torque produced by the motor equals the commanded torque $\tau_c$, eliminating the need to measure the torque of the motor directly. Therefore the sampling of the commanded torque can be considered as sampling the motor torque.

The inertia determination procedure continues to loop through blocks 51, 50 and 52 taking samples periodically until either the actual number of rotations is equal to ½ the maximum number of rotations or motor 12 reaches the test velocity $V_{test}$ at point 76 on velocity profile of FIG. 4A. When the motor reaches the test velocity $V_{test}$ or when the actual rotation count $R_{count}$ equals ½ the maximum rotation value $R_{max}$, the instantaneous value of the motor velocity is stored in database 35 at block 53 and the value of the timer 34, corresponding to the interval between times T1 and T2, is stored in database 35 at block 54. Here, the instantaneous value of motor velocity will either be the high test velocity $V_{test}$ or the maximum velocity value achieved by the motor at the intermediate position (i.e., when the rotation count $R_{count}$ reached ½ the maximum count $R_{max}$).

Continuing, processor 36 resets the timer 34 to measure the duration of the deceleration phase 72 at block 56 and issues a control signal which causes the system controller 16 to produce a zero velocity command ($\omega_c=0$) at block 57. A velocity regulator 18 responds to the zero velocity command by producing a negative commanded torque $\tau_c$ to stop the motor 12.

In some applications, the velocity command during deceleration is limited in response to various control parameters. For example, the AC-DC converter 25 may include a regulator which limits the voltage on the DC supply bus between the AC-DC converter and the PWM inverter 26. During deceleration, electric current that is induced in the motor's stator coils by the rotating magnetic field flows into the DC supply bus. If that current produces an over voltage condition the AC-DC converter 25 activates the torque limiter 23 to reduce the commanded torque during deceleration. Thus although the velocity regulator is producing a constant negative commanded torque, the torque command value at the input of the motor control 24 may vary due to system limiters. This dynamic limiting results in a non-linear deceleration and a varying motor torque. In the case of a motor where load movement and motor rotations are limited by the load range of travel, the velocity of the motor and load typically never reach a level at which regenerated power is excessive and therefore the constant commanded torque is never limited.

Referring again to FIG. 3, at block 58, processor 36 begins examining the velocity signal from the encoder 20 to determine whether the motor has stopped, i.e., reached zero velocity or some nominal velocity value. Until the motor velocity is zero or nominal, the procedure periodically acquires samples of the torque command which are placed into storage at block 60. Eventually, when motor 12 stops or the nominal velocity value is achieved, the inertia determination procedure branches to step 62 at which the value of the timer 34, corresponding to the interval between times T3 and T4 (see FIG. 4A), is stored in database 35 which completes the data acquisition. Here, while times T2 and T3 are different it should be appreciated that time T3 could be identical to time T2. Moreover, while time T1 is shown as the time when the test velocity is commanded and T4 is shown at a non-zero velocity value, it should be appreciated that time T1 could be a short time after the non-zero velocity value is commanded and time T4 could be at the zero velocity value. In short, time T1 has to be after the test velocity value was commanded, time T2 has to be after time T1 and at or before the rotation count reaches the count corresponding to the intermediate load position, time T3 has to be at or after the rotation count reaches the count corresponding to the intermediate load position and time T4 has to be after time T3 and at or before the time when the motor velocity reaches a zero value.

At block 64, processor 36 averages the accelerating torque and averages the decelerating torque samples. At block 66 processor 36 determines the rate of velocity change during acceleration and the rate of velocity change during deceleration. At block 68 processor 365 mathematically combines the average acceleration and deceleration torques and the rates of accelerating and decelerating velocity changes to generate the inertia estimate $\hat{J}$. More specifically, the inertia estimate $\hat{J}$ is derived by processor 36 by solving the following equation:

$$\hat{J} = \frac{\left|\frac{1}{N} \cdot \sum_{i=1}^{N} \tau a(i)\right| + \left|\frac{1}{M} \cdot \sum_{k=1}^{M} \tau d(k)\right|}{\left|\frac{\Delta Va}{ta}\right| + \left|\frac{\Delta Vd}{td}\right|} \quad (1)$$

where $\hat{J}$ is inertia in seconds, N is the number of torque samples acquired during the acceleration phase 70, $\tau a(i)$ is the ith torque sample acquired during motor acceleration, M is the number of torque samples acquired during the deceleration phase 72, $\tau d(k)$ is the kth torque sample acquired during motor deceleration, ΔVa is the net velocity change ($V_{T2}-V_{T1}$) during acceleration, ΔVd is the net velocity change during deceleration ($V_{T3}-V_{T4}$), ta is the acceleration time (T2–T1), and td is the deceleration time (T4–T3). The above equation employs the absolute values of the terms.

It should be appreciated that the average torque during acceleration is a positive value, whereas the average torque during deceleration is a negative value. Similarly the change in velocity ΔVa during the acceleration phase is positive, and the velocity change ΔVd during the deceleration phase is negative. Therefore, Equation 1 may be rewritten as:

$$\hat{J} = \frac{\left|\frac{1}{N} \cdot \sum_{i=1}^{N} \tau a(i)\right| - \left|\frac{1}{M} \cdot \sum_{k=1}^{M} \tau d(k)\right|}{\left|\frac{\Delta Va}{ta}\right| - \left|\frac{\Delta Vd}{td}\right|} \quad (2)$$

in which the absolute values are not required and the plus signs have been replaced with minus signs (subtracting a negative value is equivalent to adding the absolute value of that negative value). Both methods can be generically referred to as summing the magnitudes of the respective values.

Therefore, the determination of the inertia $\hat{J}$ separately averages torque of the motor during the acceleration phase and the deceleration phase and then sums the magnitudes of those averages. The change in velocity during acceleration is divided by the acceleration time to derive the rate of acceleration. A similar derivation of the rate of deceleration involves dividing the change in velocity during the deceleration phase by the deceleration time. The inertia $\hat{J}$ of the motor system is the average torque magnitude sum divided by the sum of the magnitudes of the acceleration rate and the deceleration rate. Once the motor system inertia has been determined, the inertia value $\hat{J}$ is stored in output register 38 of the inertia module 28 and applied as an input to velocity regulator 18.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

To apprise the public of the scope of this invention, the following claims are made:

What is claimed is:

1. A method for estimating inertia of an electric motor that drives a load wherein the load has a limited range of load travel, the method comprising the steps of:
   identifying an intermediate position along the range of load travel that is separated from a first end of the range of load travel;
   receiving a sensor signal from a sensor attached to the electric motor;
   with the load separated from a first end of the range of load travel, increasing a velocity of the electric motor from a first velocity as the load travels toward the first end of the range of load travel;
   identifying when the load has reached the intermediate position;
   identifying the motor velocity at the intermediate position as a second velocity;
   in response to the sensor signal, detecting a first rate of velocity change from the first velocity to the second velocity;
   acquiring a plurality of torque samples while the electric motor is changing velocity, each torque sample representing an amount of torque generated by the electric motor;
   calculating a first torque average by averaging the plurality of torque samples; and
   deriving an inertia value as a function of the first rate of velocity change and the first average amount of torque.

2. The method as recited in claim 1 wherein detecting the first rate of velocity change comprises:
   measuring an amount of time for the electric motor to change from the first velocity to the second velocity;
   calculating a difference between the first velocity and the second velocity; and
   dividing the difference by the amount of time.

3. The method as recited in claim 2 further comprising:
   decreasing the velocity of the electric motor from a third velocity to a fourth velocity;
   detecting a second rate of velocity change from the third velocity to the fourth velocity;
   detecting a second average amount of torque produced by the electric motor while the velocity changes from the third velocity to the fourth velocity; and
   wherein the inertia value also is derived as a function of the second rate of velocity change and the second average amount of torque.

4. The method as recited in claim 3 wherein detecting the second rate of velocity change comprises:
   measuring an amount of time for the electric motor to change from the third velocity to the fourth velocity;
   calculating a difference between the third velocity and the fourth velocity; and
   dividing the difference by the amount of time for the electric motor to change from the third velocity to the fourth velocity.

5. The method of claim 3 wherein the second and third velocities are identical.

6. The method of claim 3 wherein the step of deriving the inertia value includes adding the magnitudes of the first and second average amounts of torque to generate an average torque magnitude sum, adding the magnitudes of the first and second rates of velocity change to generate an acceleration/deceleration sum and dividing the average torque magnitude sum by the acceleration/deceleration sum to generate the inertia value.

7. The method of claim 1 wherein the first end of the range of load travel corresponds to X rotations of the electric motor, the intermediate position is a position corresponding to between X/3 and 2X/3 rotations of the electric motor and wherein the step of identifying when the load has reached the intermediate position includes identifying when the electric motor has rotated the number of rotations corresponding to the intermediate position.

8. The method of claim 7 wherein the intermediate position is a position corresponding to substantially X/2 rotations of the electric motor.

9. A method for estimating inertia of an electric motor that drives a load wherein the load has a limited range of load travel, the method comprising the steps of:
   identifying an intermediate position along the range of load travel that is separated from a first end of the range of load travel;
   receiving a sensor signal from a sensor attached to the electric motor;

with the load separated from a first end of the range of load travel, accelerating the electric motor from a first velocity toward a higher velocity as the load travels toward the first end of the range of load travel;

acquiring a plurality of torque samples while the electric motor is accelerating, each torque sample representing an amount of torque generated by the electric motor;

identifying when the load has reached the intermediate position;

identifying the motor velocity at the intermediate position as a second velocity;

calculating a first torque average by averaging the plurality of torque samples as the motor velocity changes from the first velocity to the second velocity;

determining a first rate of velocity change from the first velocity to the second velocity;

decelerating the electric motor from a third velocity to a fourth velocity;

acquiring a plurality of torque samples while the electric motor is decelerating, each torque sample representing an amount of torque generated by the electric motor;

calculating a second torque average by averaging the plurality of torque samples as the motor velocity changes from the third velocity to the fourth velocity;

determining a second rate of velocity change from the third velocity to the fourth velocity; and deriving an inertia value as a function of the first and second rates of velocity change and the first and second average amounts of torque.

10. The method as recited in claim 9 wherein:
(i) detecting the first rate of velocity change comprises:
measuring an amount of time for the electric motor to change from the first velocity to the second velocity;
calculating a difference between the first velocity and the second velocity; and
dividing the difference by the amount of time; and
(ii) detecting the second rate of velocity change comprises:
measuring an amount of time for the electric motor to change from the third velocity to the fourth velocity;
calculating a difference between the third velocity and the fourth velocity; and
dividing the difference by the amount of time for the electric motor to change from the third velocity to the fourth velocity.

11. The method of claim 9 wherein the step of deriving the inertia value includes adding the magnitudes of the first and second average amounts of torque to generate an average torque magnitude sum, adding the magnitudes of the first and second rates of velocity change to generate an acceleration/deceleration sum and dividing the average torque magnitude sum by the acceleration/deceleration sum to generate the inertia value.

12. The method of claim 9 wherein the first end of the range of load travel corresponds to X rotations of the electric motor, the intermediate position is a position corresponding to between X/3 and 2X/3 rotations of the electric motor and wherein the step of identifying when the load has reached the intermediate position includes identifying when the electric motor has rotated the number of rotations corresponding to the intermediate position.

13. The method of claim 12 wherein the intermediate position is a position corresponding to substantially X/2 rotations of the electric motor.

14. An apparatus for estimating inertia of an electric motor that drives a load wherein the load has a limited range of load travel, the apparatus comprising:
a controller that, with the load separated from a first end of the range of load travel, increases a velocity of the electric motor from a first velocity toward a test velocity as the load travels form an initial position toward a first end of the range of load travel;

an inertia processor programmed to:
(i) acquire a plurality of torque samples while the electric motor is changing velocity, each torque sample representing an amount of torque generated by the electric motor;
(ii) determine when the load has reached an intermediate position between the initial position and the first end of the range of load travel;
(iii) identify the motor velocity at the intermediate position as a second velocity;
(iv) determine a first rate of velocity change from the first velocity to the second velocity;
(v) calculate a first torque average by averaging the plurality of torque samples; and
(vi) derive an inertia value as a function of the first rate of velocity change and the first average amount of torque.

15. The apparatus as recited in claim 14 wherein the controller further decreases the velocity of the electric motor from a third velocity to a fourth velocity while the processor further performs the acts of detecting a second rate of velocity change from the third velocity to the fourth velocity and detecting a second average amount of torque produced by the electric motor while the velocity changes from the third velocity to the fourth velocity, the processor deriving the inertia value also as a function of the second rate of velocity change and the second average amount of torque.

16. The apparatus as recited in claim 15 wherein:
(i) the processor determines the first rate of velocity change by performing the acts of:
measuring an amount of time for the electric motor to change from the first velocity to the second velocity;
calculating a difference between the first velocity and the second velocity; and
dividing the difference by the amount of time; and
(ii) the processor determines the second rate of velocity change by performing the acts of:
measuring an amount of time for the electric motor to change from the third velocity to the fourth velocity;
calculating a difference between the third velocity and the fourth velocity; and
dividing the difference by the amount of time for the electric motor to change from the third velocity to the fourth velocity.

17. The method of claim 15 wherein the step of deriving the inertia value includes adding the magnitudes of the first and second average amounts of torque to generate an average torque magnitude sum, adding the magnitudes of the first and second rates of velocity change to generate an acceleration/deceleration sum and dividing the average torque magnitude sum by the acceleration/deceleration sum to generate the inertia value.

18. The method of claim 14 wherein the first end of the range of load travel corresponds to X rotations of the electric motor, the intermediate position is a position corresponding to between X/3 and 2X/3 rotations of the electric motor and wherein the step of identifying when the load has reached the intermediate position includes identifying when the electric motor has rotated the number of rotations corresponding to the intermediate position.

19. The method of claim 18 wherein the intermediate position is a position corresponding to substantially X/2 rotations of the electric motor.

* * * * *